US012308583B2

(12) United States Patent
Kan et al.

(10) Patent No.: US 12,308,583 B2
(45) Date of Patent: May 20, 2025

(54) JOINT AND CONNECTOR INCLUDING THE SAME

(71) Applicant: KINSUN INDUSTRIES INC., Taoyuan (TW)

(72) Inventors: Ching-Neng Kan, Taoyuan (TW); Yihung Chang, Taoyuan (TW); Li-Chin Yang, Taoyuan (TW); Ching-Huang Lu, Taoyuan (TW)

(73) Assignee: KINSUN INDUSTRIES INC., Taoyuan (TW)

( * ) Notice: Subject to any disclaimer, the term of this patent is extended or adjusted under 35 U.S.C. 154(b) by 366 days.

(21) Appl. No.: 18/152,928

(22) Filed: Jan. 11, 2023

(65) Prior Publication Data

US 2023/0369812 A1 Nov. 16, 2023

(30) Foreign Application Priority Data

May 13, 2022 (TW) ................................ 111204950

(51) Int. Cl.

*H01R 24/40* (2011.01)
*H01R 12/91* (2011.01)
*H01R 13/506* (2006.01)
*H01R 13/631* (2006.01)

(52) U.S. Cl.

CPC ........... *H01R 24/40* (2013.01); *H01R 13/506* (2013.01); *H01R 12/91* (2013.01); *H01R 13/6315* (2013.01)

(58) Field of Classification Search

CPC ...... H01R 24/40; H01R 13/506; H01R 12/91; H01R 13/6315; H01R 24/542; H01R 24/50; H01R 2103/00

See application file for complete search history.

(56) References Cited

U.S. PATENT DOCUMENTS

| | | | | |
|---|---|---|---|---|
| 4,593,464 A * | 6/1986 | Williams | H01R 24/38 | 228/136 |
| 6,409,519 B1 * | 6/2002 | Bacon | H01R 24/42 | 439/63 |
| 6,875,024 B2 * | 4/2005 | Nagano | H01R 13/41 | 439/63 |
| 9,806,458 B1 * | 10/2017 | Chiu | H01R 13/40 | |

FOREIGN PATENT DOCUMENTS

EP 3916924 A2 * 12/2021 ............. H01R 12/71

* cited by examiner

*Primary Examiner* — Briggitte R. Hammond

(74) *Attorney, Agent, or Firm* — MUNCY, GEISSLER, OLDS & LOWE, P.C.

(57) ABSTRACT

A joint and a connector including the same are provided, and the joint including: a seat body, a movable member, an elastic cushioning member and a sleeve member. The seat body includes a moving space and a barrel defining the moving space, and the barrel is insulated and having a radial cross-section contour which is round. The movable member is movably disposed within the moving space, and the movable member includes an insertion slot and two engaging recesses. The insertion slot extends in an axial direction of the movable member. The elastic cushioning member includes two clamping portions, two cushioning portions and a connecting portion connected between the two clamping portions and the two cushioning portions. Each of the two clamping portions includes a first inclined segment which is at least partially exposed from the end opening of the insertion slot.

12 Claims, 10 Drawing Sheets

JOINT AND CONNECTOR INCLUDING THE SAME

BACKGROUND OF THE INVENTION

Field of the Invention

The present invention relates to a joint and a connector including the same.

Description of the Prior Art

A conventional connector for cable connection, such as a coaxial connector, includes a plug and a socket. The plug includes a central terminal, and the socket includes a contact member connected with the central terminal for quick connection and signal transmission.

However, when the plug is inserted into the socket, the central terminal is easy to deform or misalign with the contact member due to improper operation, which may result in poor contact and poor transmission effects. Moreover, the conventional connector has a complicated structure and poor anti-noise effect and is not conductive to minimization and manufacturing.

The present invention is, therefore, arisen to obviate or at least mitigate the above-mentioned disadvantages.

SUMMARY OF THE INVENTION

The main object of the present invention is to provide a joint and a connector including the same, which provides stable connection and is durable to use.

To achieve the above and other objects, the present invention provides a joint, configured to be connected with a central terminal of a connector, including: a seat body, a movable member, an elastic cushioning member and a sleeve member. The seat body includes a moving space and a barrel defining the moving space, and the barrel is insulated and has a radial cross-section contour which is round. The barrel includes an opening which is communicated with the moving space and configured for the central terminal to penetrate therethrough. The movable member is movably disposed within the moving space and includes an insertion slot and two engaging recesses. The insertion slot extends in an axial direction of the movable member, and the two engaging recesses are communicated with an end opening of the insertion slot facing the opening and located at two opposite sides of the insertion slot in a first radial direction. The elastic cushioning member includes two clamping portions engaged within the two engaging recesses, two cushioning portions abutted against an inner peripheral surface of the barrel and a connecting portion connected between the two clamping portions and the two cushioning portions. The two clamping portions are located at two opposite sides of the connecting portion in the first radial direction, and the two cushioning portions are located at two opposite sides of the connecting portion in a second radial direction lateral to the first radial direction. Each of the two clamping portions includes a first inclined segment which radially extends outward and is at least partially exposed from the end opening of the insertion slot. Each of the two cushioning portions extends curvedly in the second radial direction. The sleeve member is sleeved to an outer peripheral surface of the seat body and includes an abutting structure being radially deformable.

To achieve the above and other objects, the present invention further provides a connector, including the joint as described above, further including a plug. The plug has the central terminal disposed thereon and includes an annular wall surrounding and spaced apart from the central terminal. When the central terminal is connected with the joint, the abutting structure is received inside the annular wall and abutted against the annular wall.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
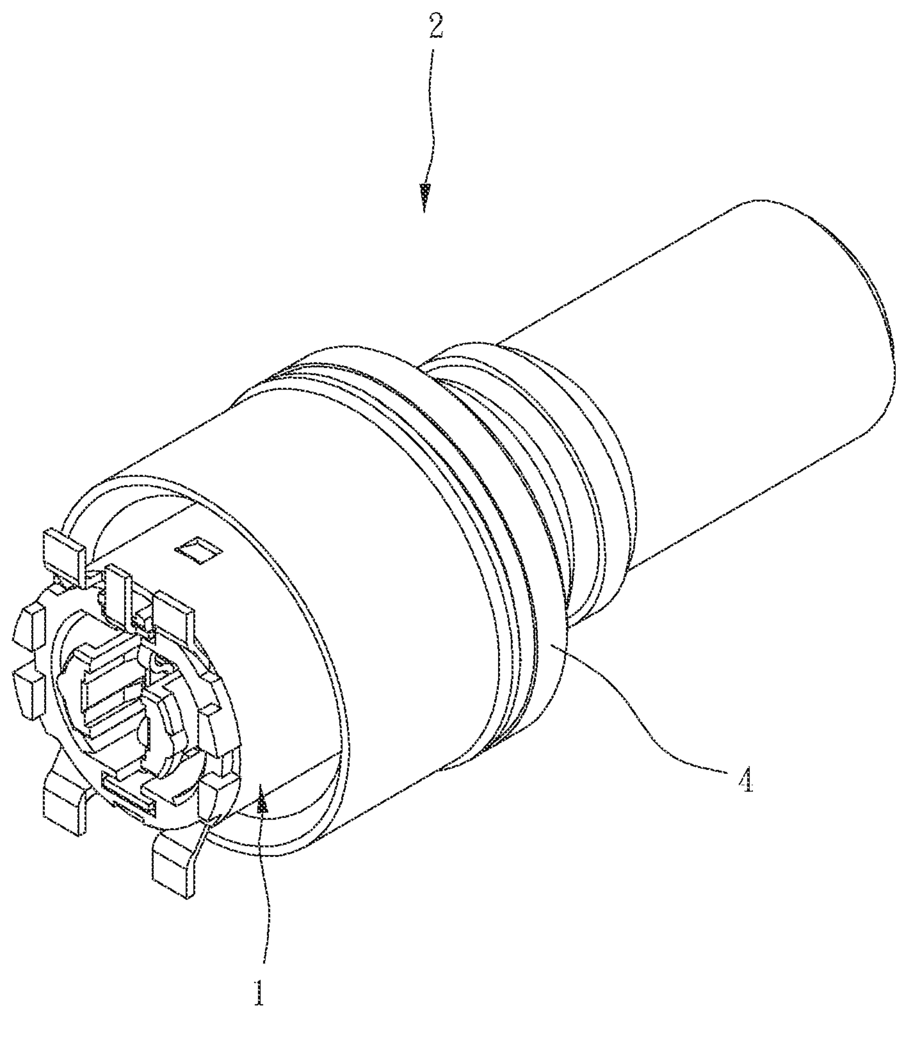
FIG. 1 is a stereogram of a preferable embodiment of the present invention.
Figures 2, 3:
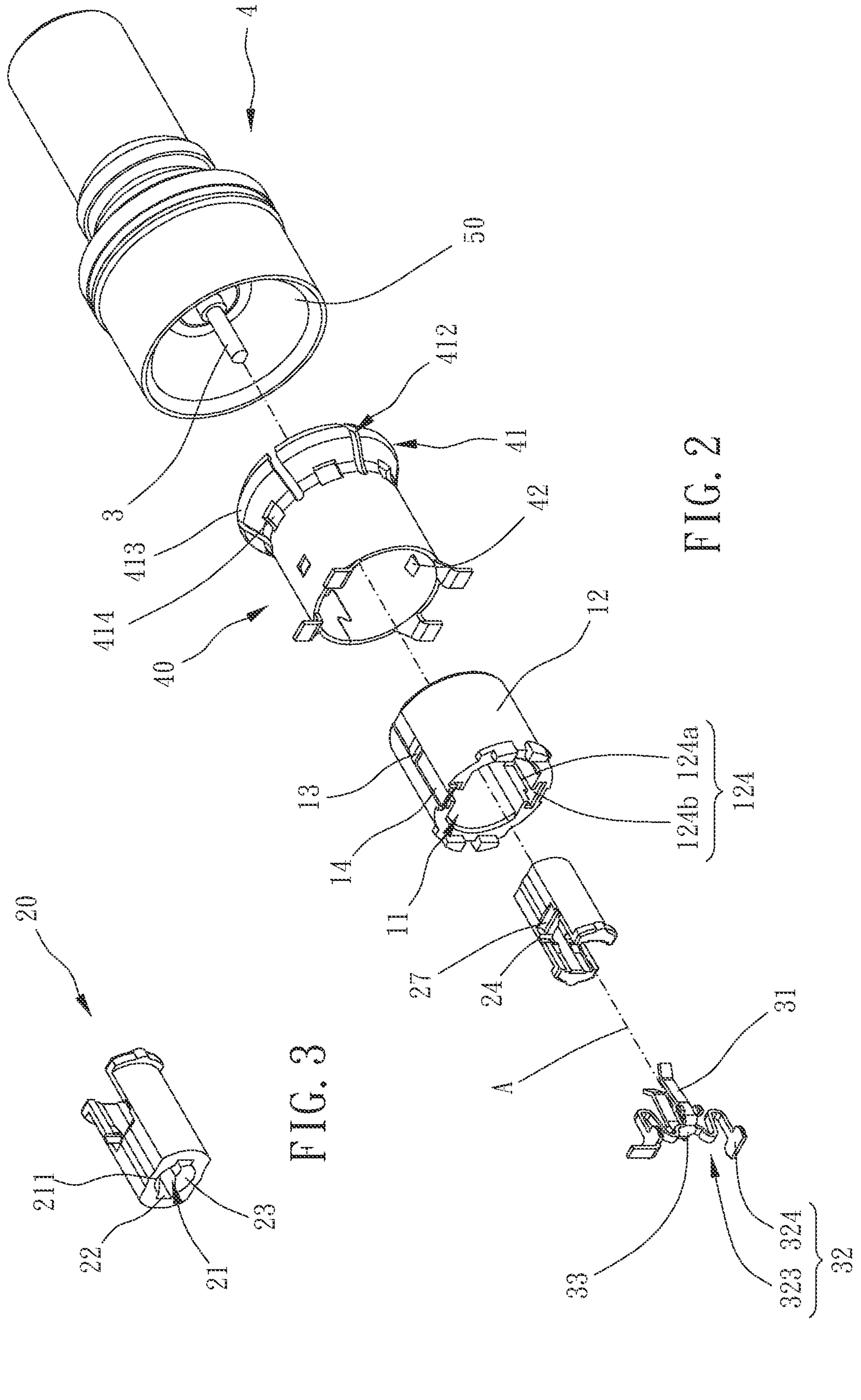
FIG. 2 is a breakdown drawing of a preferable embodiment of the present invention.
FIG. 3 is a stereogram of a movable member according to a preferable embodiment of the present invention.
Figure 4:
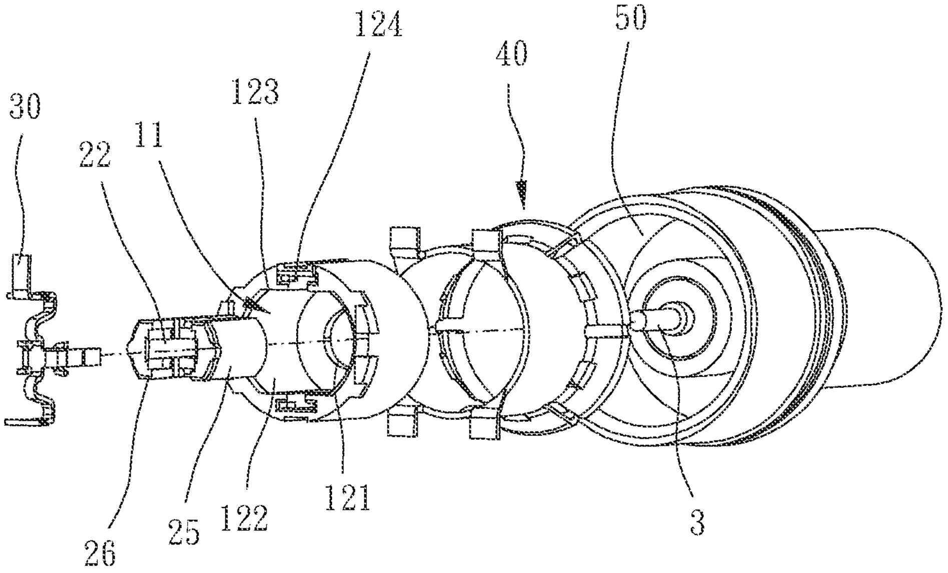
FIG. 4 is a breakdown drawing of a preferable embodiment of the present invention as viewed from another side.

Please refer to FIGS. 1 to 9 for a preferable embodiment of the present invention. A joint 1 of the present invention is configured to be connected with a central terminal 3 of a connector 2, including: a seat body 10, a movable member 20, an elastic cushioning member 30 and a sleeve member 40. The connector 2 may be a coaxial connector, and the central terminal 3 may be a metallic conductor.

The seat body 10 includes a moving space 11 and a barrel 12 defining the moving space 11, and the barrel 12 is insulated and has a radial cross-section contour which is round. The barrel 12 includes an opening 121 which is communicated with the moving space 11 and configured for the central terminal 3 to penetrate therethrough. The movable member 20 is movably disposed within the moving space 11 and includes an insertion slot 21 and two engaging recesses 22. The insertion slot 21 extends in an axial direction A of the movable member 20, and the two engaging recesses 22 are communicated with an end opening 211 of the insertion slot 21 facing the opening 121 and located at two opposite sides of the insertion slot 21 in a first radial direction R1. The elastic cushioning member 30 includes two clamping portions 31 engaged within the two engaging recesses 22, two cushioning portions 32 abutted against an inner peripheral surface of the barrel 12 and a connecting portion 33 connected between the two clamping portions 31 and the two cushioning portions 32. The two clamping portions 31 are located at two opposite sides of the connecting portion 33 in the first radial direction R1, and the two cushioning portions 32 are located at two opposite sides of the connecting portion 33 in a second radial direction R2 lateral to the first radial direction R1. Each of the two clamping portions 31 includes a first inclined segment 311 which radially extends outward and is at least partially exposed from the end opening 211 of the insertion slot 21, and each of the two cushioning portions 32 extends curvedly in the second radial direction R2. The sleeve member 40 is sleeved to an outer peripheral surface of the seat body 10 and includes an abutting structure 41 being radially deformable. Therefore, the elastic cushioning member 30 allows the movable member 20 to move along the first radial direction R1 and the second radial direction R2 relative to the seat body 10, which prevents the central terminal 3 from deformation or being misaligned with the joint 1 due to improper insertion so as to provide stable connection and durability.

Figure 5:
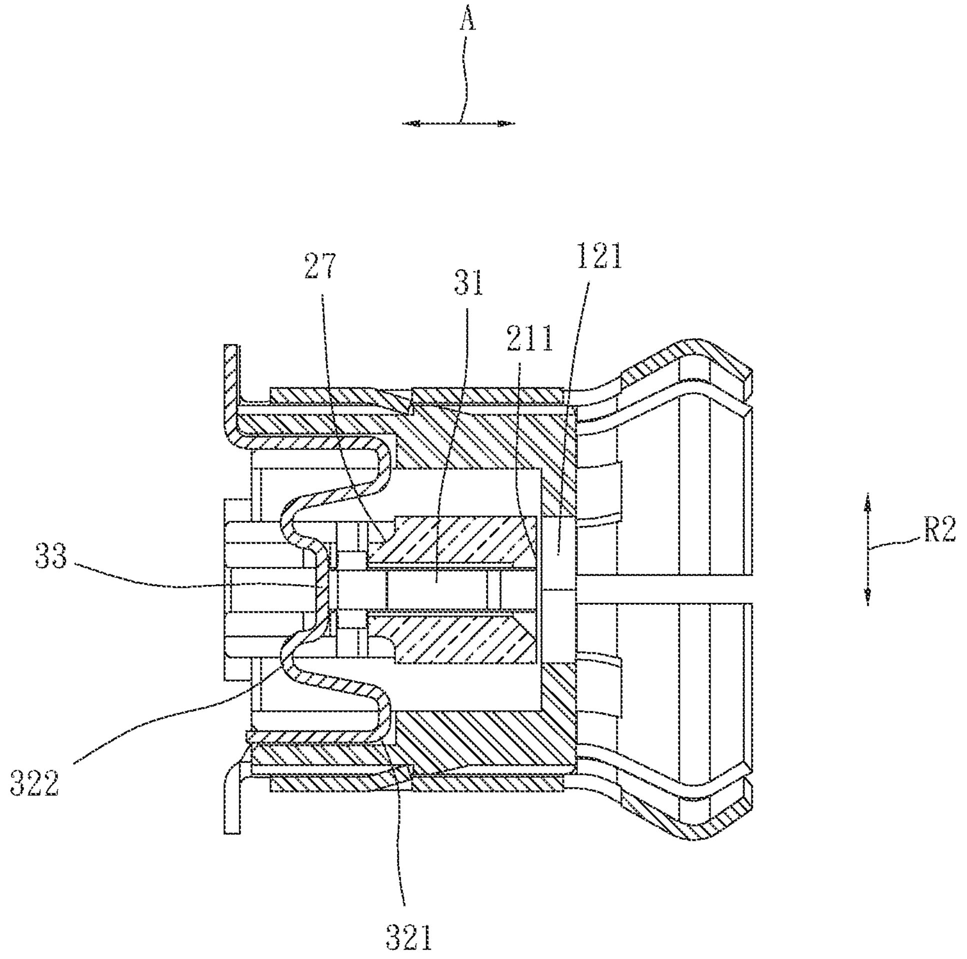
FIG. 5 is a cross-sectional view of a preferable embodiment of the present invention.

Refer to FIG. 5, each of the two cushioning portions 32 is an elastic arm and includes a first bending section 321 and a second bending section 322 connected between the first bending section 321 and the connecting portion 33, and a concave direction of the first bending section 321 is opposite to a concave direction of the second bending section 322. In the axial direction A, a concave depth of each said first bending section 321 is larger than a concave depth of one said second bending section 322. Therefore, said second bending sections 322 adjacent to the connecting portion 33 have small deformation margin, which allows a portion of the connecting portion 33 for contacting with the central terminal 3 to be stable. Said first bending sections 321 remote form the connecting portion 33 have large deformation margin, which provides good cushioning effect in the second radial direction R2. In this embodiment, the movable member 20 is a metallic piece (such as a copper piece) integrally formed of one piece, and the metallic piece is integrally bent and rolled to form each said first bending section 321 and each said second bending section 322, which is easy to process and provides good elasticity and structural strength.

Figure 6:
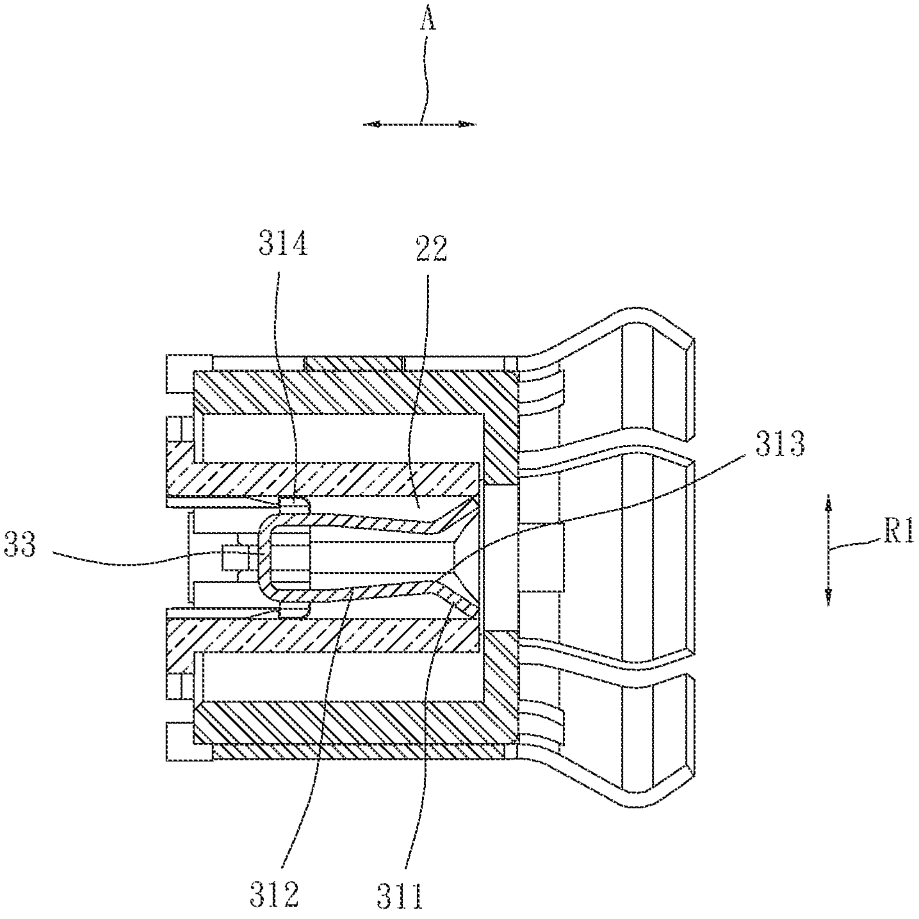
FIG. 6 is another cross-sectional view of a preferable embodiment of the present invention.
Figure 7:
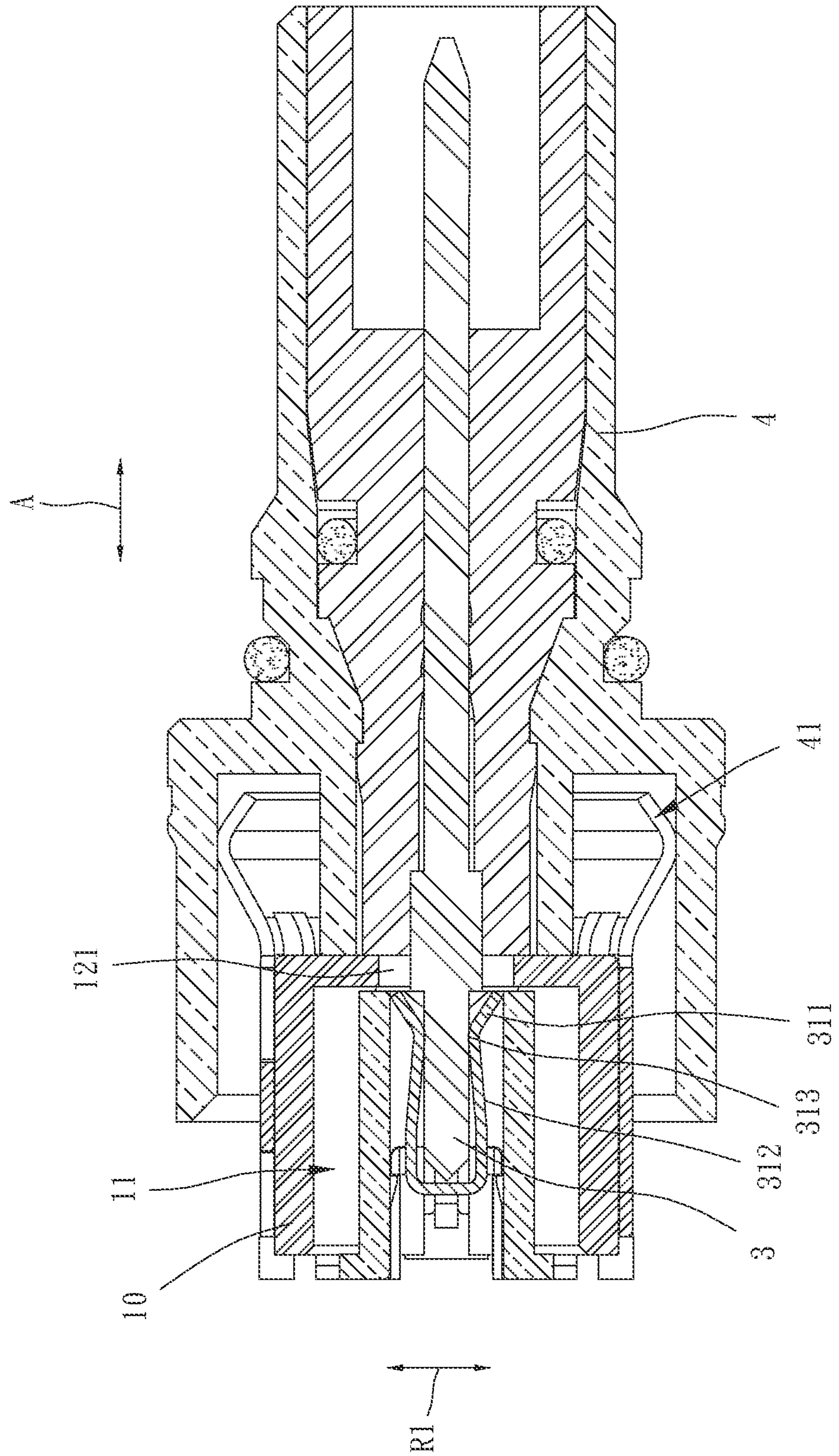
FIG. 7 is a cross-sectional view of FIG. 1.

The movable member 20 further includes two inclined guiding surfaces 23 surrounding the end opening 211, and each of the two inclined guiding surfaces 23 is located between the two engaging recesses 22. An end of the movable member 20 with the end opening 211 non-protrudes beyond the opening 121 in the axial direction A. Therefore, the two inclined guiding surfaces 23 and the two first inclined segments 311 are configured to guild the central terminal 3 to be inserted into the insertion slot 21, which prevents components of the joint 1 from being damaged due to improper insertion orientation and prevents the movable member 20 from unexpected collision. Refer to FIGS. 6-7, each of the two clamping portions 31 further includes a second inclined segment 312 connected between one said first inclined segment 311 and the connecting portion 33, and each said second inclined segment 312 and one said first inclined segment 311 are transitionally connected and define a contact portion 313 configured to contact with the central terminal 3 so that the two clamping portions 31 are elastically deformable to stably clamp the central terminal 3. Specifically, two opposite sides of each said second inclined segment 312 include at least two projections 314 extending in a direction remote from the connecting portion 33, and the movable member 20 includes a plurality of recessions 24 corresponding to the at least two projections 314. Each of said projections 314 is engaged within one of the plurality of recessions 24 so that the movable member 20 is co-movable with the elastic cushioning member 30 in the axial direction A, and the said projections 314 avoid excessive deformation of each said second inclined segment 312, as shown in FIG. 9, which provides good cushioning effect and prevents the central terminal 3 from being misaligned.

In the first radial direction R1, the inner peripheral surface of the barrel 12 includes two first arcuate surfaces 122 radially corresponding to each other, an outer peripheral surface of the movable member 20 includes two second arcuate surfaces 25 facing the two first arcuate surfaces 122. In the second radial direction R2, the inner peripheral surface of the barrel 12 includes two first cutting surfaces 123 radially corresponding to each other, and the outer peripheral surface of the movable member 20 includes two second cutting surfaces 26 facing the two first cutting surfaces 123, which is conducive to miniaturization. The movable member 20 is preferably entirely located in the moving space 11 so as to completely shade the movable member 20 and the elastic cushioning member 30 for good anti-noise effect. Each of the two first cutting surfaces 123 has a restricting slot 124 disposed thereon, and each said restricting slot 124 includes a narrow section 124*a* and a broad section 124*b* communicated with each other. Each of the two cushioning portions 32 includes a flexible section 323 and an abutting section 324 connected with an end of the flexible section 323, the flexible section 323 is partially received within the narrow section 124*a*, and the abutting section 324 is received within the broad section 124*b*, which is convenient to assemble and provides stable engagement.

Figure 8:
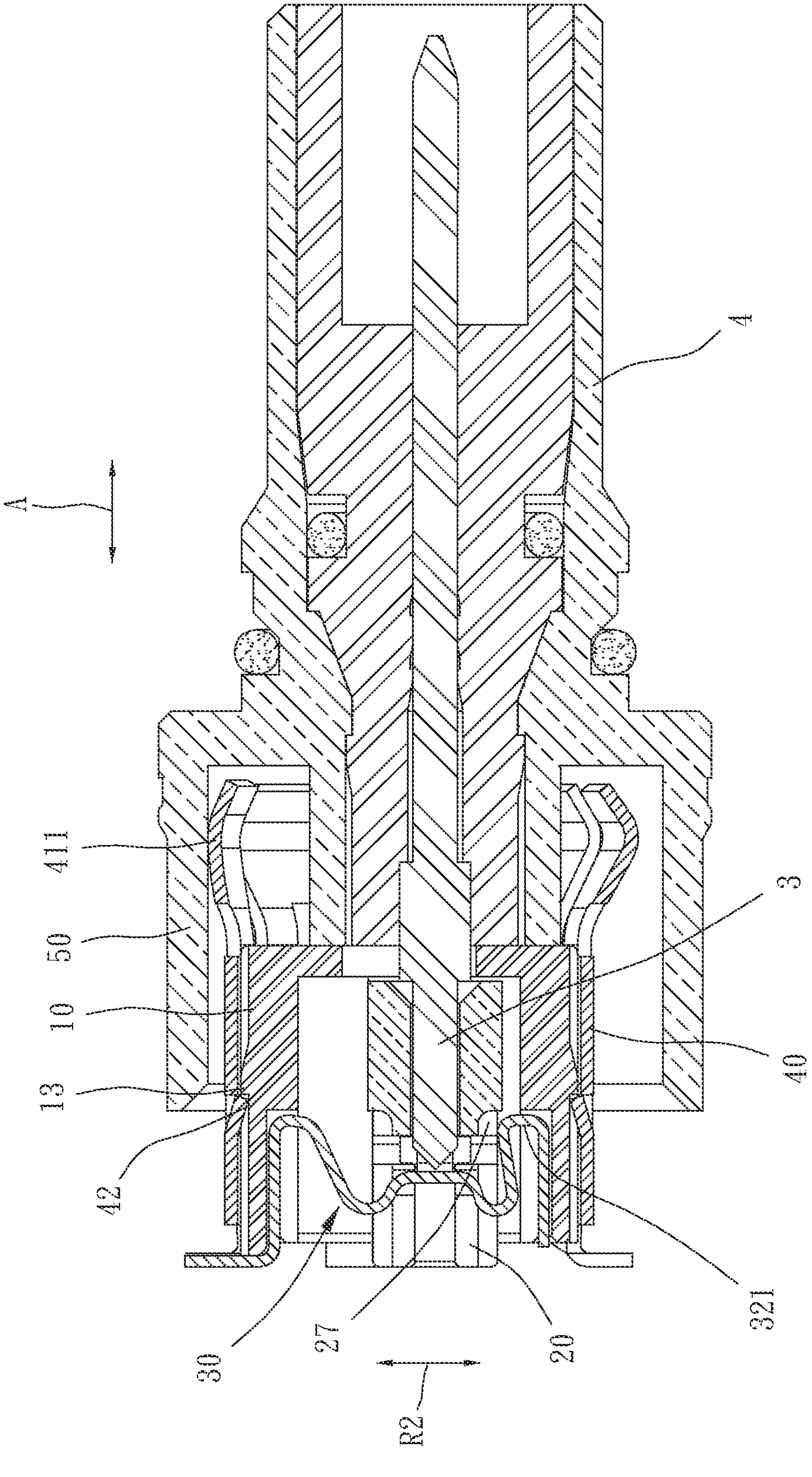
FIGS. 8-9 are drawings showing operation of a preferable embodiment of the present invention.
Figure 9:
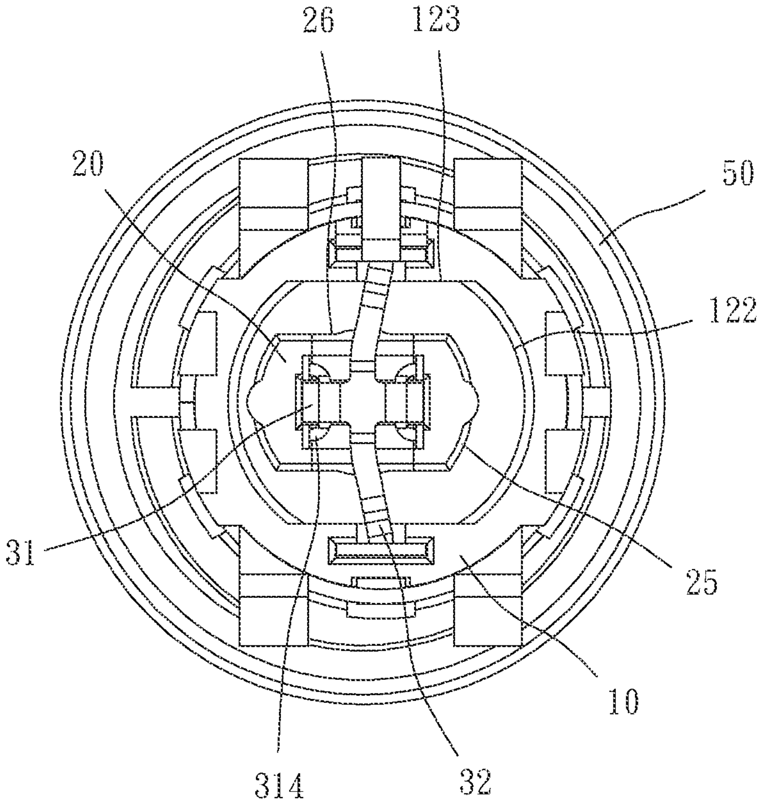

When the central terminal 3 is axially shifted relative to the joint 1, the movable member 20 is urged by the central terminal 3 to compress the elastic cushioning member 30, and the movable member 20 is moved relative to the seat body 10, as shown in FIGS. 8-9. Therefore, the central terminal 3 has a stable contact with the two clamping portions 31. Specifically, both of the two cushioning portions 32 can provide elastic deformation margin in the first radial direction R1 so as to have good cushioning effect. Preferably, the movable member 20 further includes two notches 27 facing the two first bending sections 321. When the movable member 20 is axially shifted relative to the seat body 10, the two first bending sections 321 are urged to deform, and one of the two first bending sections 321 is partially located within one of the two notches 27, which is conductive to minimization. When the joint 1 is free of abutment of the central terminal 3, the elastic cushioning member 30 drives the movable member 20 to move relative to the seat body 10 to a position axially corresponding to the central terminal 3.

The outer peripheral surface of the seat body 10 has a first engaging portion 13, and an inner peripheral surface of the sleeve member 40 has a second engaging portion 42. The first engaging portion 13 and the second engaging portion 42 are interferingly engageable with each other in the axial direction A. Preferably, the outer peripheral surface of the seat body 10 further includes at least one guiding groove 14 extending in a direction parallel to the axial direction A, and the first engaging portion 13 is located within the at least one guiding groove 14. The second engaging portion 42 is slidable along the at least one guiding groove 14, which has a simple structure and is easy to be assembled.

The present invention further provides a connector 2, including the joint 1 as described above, further including a plug 4. The plug 4 has the central terminal 3 disposed thereon and includes an annular wall 50 surrounding and spaced apart from the central terminal 3. When the central terminal 3 is connected with the joint 1, the abutting structure 41 is received inside the annular wall 50 and abutted against the annular wall 50. In this embodiment, the abutting structure 41 includes a plurality of supporting pieces 411 and a plurality of cutting slots 412 arranged alternatively around the axial direction A, and each of the plurality of supporting pieces 411 is bended in the axial direction A and includes an arcuate abutting surfaces 413 arched outward. Each said arcuate abutting surfaces 413 is configured to be radially abutted against the annular wall 50. The plurality of cutting slots 412 are open toward an opening of the sleeve member 40; the plurality of supporting pieces 411 protrude beyond an end surface of the seat body 10 in the axial direction A, and each of the plurality of supporting pieces 411 has at least one through hole 414 located at a side of one of said arcuate abutting surfaces 413 close to the seat body 10. Therefore, the plurality of supporting pieces 411 is axially and radially deformable so as to be stably connected with the joint 1.

Figure 10:
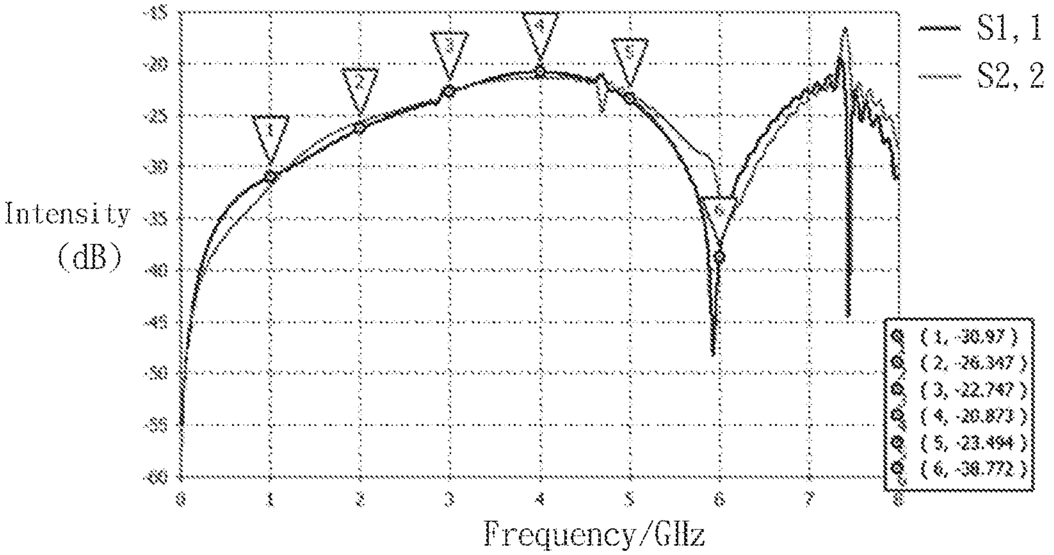
FIG. 10 is a modeling diagram of scattering parameters according to a preferable embodiment of the present invention.
Figure 11:
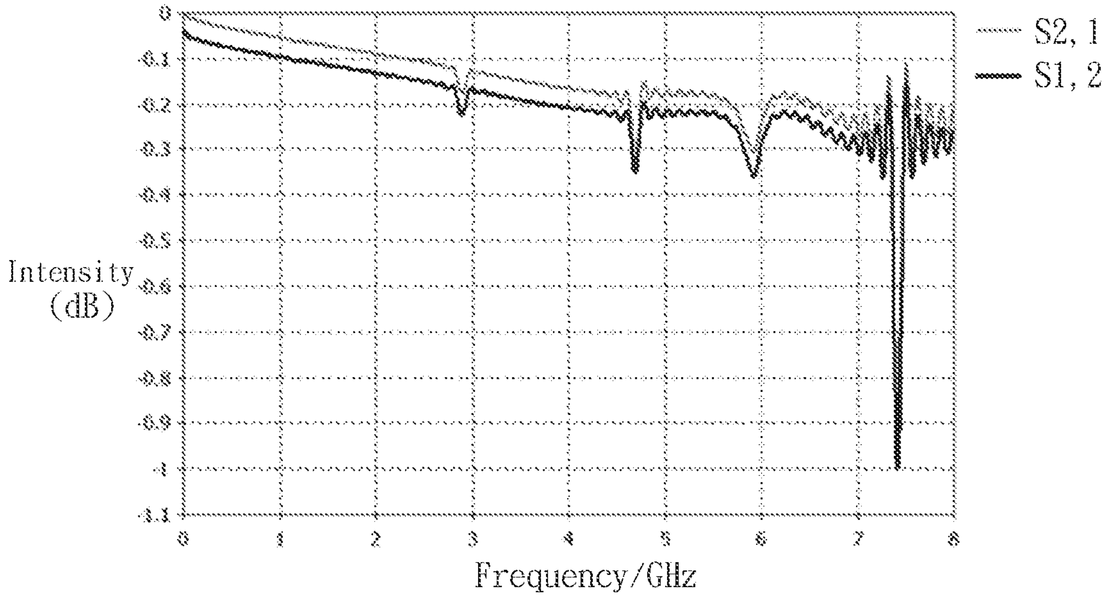
FIG. 11 is another modeling diagram of scattering parameters according to a preferable embodiment of the present invention.
Figure 12:
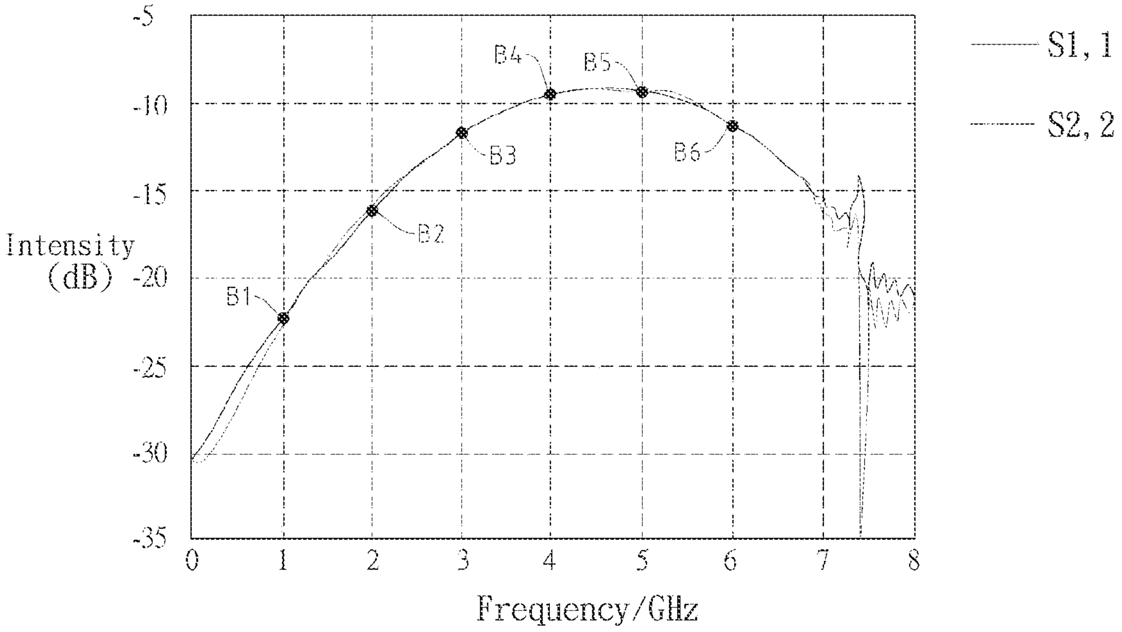
FIG. 12 PRIOR ART
FIG. 12 is a modeling diagram of scattering parameters according to a conventional connector.

Please refer to FIGS. 10-12, FIG. 10 and FIG. 11 are modeling diagrams of scattering parameters (S-parameters) of the connector 2, and FIG. 12 is a modeling diagram of S-parameters of a conventional connector. The modeling diagrams are used to compare the property differences (such as signal reflection, signal loss, or the like) between transmission channels respectively formed by the connector 2 and the conventional connector. In FIGS. 10-12, the frequency (GHz) is plotted on X-axis, and the intensity (dB) is plotted on Y-axis. Lines S1, 1 plotted in FIGS. 10 and 12 respectively represent a reflection coefficient (return loss) of a port 1 of the connector under test (one of the joint 1 and the plug 4), and lines S2, 2 plotted in FIGS. 10 and 12 respectively represent a reflection coefficient of a port 2 of the connector (the other of the joint 1 and the plug 4). A line S1, 2 plotted in FIG. 11 represents a reverse transmission coefficient when a signal is transmitted from the port 2 to the port 1, and a line S2, 1 plotted in FIG. 11 represents a forward transmission coefficient (insertion loss) when the signal is transmitted from the port 1 to the port 2.

As shown in FIGS. 10 and 12, compare with the conventional connector, the connector 2 of the present invention provides high intensity in all frequency bands and less energy loss. As shown in FIG. 11, the connector 2 of the present invention provides less insertion loss during transmission, high transmission efficiency and good electrical performance.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A joint, configured to be connected with a central terminal of a connector, including:

a seat body, including a moving space and a barrel defining the moving space, the barrel being insulated and having a radial cross-section contour which is round, the barrel including an opening which is communicated with the moving space and configured for the central terminal to penetrate therethrough;

a movable member, movably disposed within the moving space, including an insertion slot and two engaging recesses, the insertion slot extending in an axial direction of the movable member, the two engaging recesses being communicated with an end opening of the insertion slot facing the opening and located at two opposite sides of the insertion slot in a first radial direction;

an elastic cushioning member, including two clamping portions engaged within the two engaging recesses, two cushioning portions abutted against an inner peripheral surface of the barrel and a connecting portion connected between the two clamping portions and the two cushioning portions, the two clamping portions located at two opposite sides of the connecting portion in the first radial direction, the two cushioning portions located at two opposite sides of the connecting portion in a second radial direction lateral to the first radial direction, each of the two clamping portions including a first inclined segment which radially extends outward and is at least partially exposed from the end opening of the insertion slot, each of the two cushioning portions extending curvedly in the second radial direction; and a sleeve member, sleeved to an outer peripheral surface of the seat body, including an abutting structure being radially deformable.

2. The joint of claim 1, wherein the movable member further includes two inclined guiding surfaces surrounding the end opening, each of the two inclined guiding surfaces is located between the two engaging recesses, and an end of the movable member with the end opening non-protrudes beyond the opening in the axial direction.

3. The joint of claim 1, wherein each of the two cushioning portions is an elastic arm and includes a first bending section and a second bending section connected between the first bending section and the connecting portion, and a concave direction of the first bending section is opposite to a concave direction of the second bending section.

4. The joint of claim 3, wherein in the axial direction, a concave depth of each said first bending section is larger than a concave depth of one said second bending section.

5. The joint of claim 1, wherein in the first radial direction, the inner peripheral surface of the barrel includes two first arcuate surfaces radially corresponding to each other, an outer peripheral surface of the movable member includes two second arcuate surfaces facing the two first arcuate surfaces; in the second radial direction, the inner peripheral surface of the barrel includes two first cutting surfaces radially corresponding to each other, and the outer peripheral surface of the movable member includes two second cutting surfaces facing the two first cutting surfaces.

6. The joint of claim 5, wherein each of the two first cutting surfaces has a restricting slot disposed thereon, each said restricting slot includes a narrow section and a broad section communicated with each other, each of the two cushioning portions includes a flexible section and an abutting section connected with an end of the flexible section, the flexible section is partially received within the narrow section, and the abutting section is received within the broad section.

7. The joint of claim 1, wherein the outer peripheral surface of the seat body has a first engaging portion, an inner peripheral surface of the sleeve member has a second engaging portion, and the first engaging portion and the second engaging portion are interferingly engageable with each other in the axial direction.

8. The joint of claim 7, wherein the outer peripheral surface of the seat body further includes at least one guiding groove extending in a direction parallel to the axial direction, the first engaging portion is located within the at least one guiding groove, and the second engaging portion is slidable along the at least one guiding groove.

9. The joint of claim 1, wherein the abutting structure includes a plurality of supporting pieces and a plurality of cutting slots arranged alternatively around the axial direction, each of the plurality of supporting pieces is bended in the axial direction and includes an arcuate abutting surface arched outward, and each said arcuate abutting surfaces is configured to be radially abutted against an annular wall of the connector surrounding the central terminal.

10. The joint of claim 9, wherein the plurality of supporting pieces protrude beyond an end surface of the seat body in the axial direction, and each of the plurality of supporting pieces has at least one through hole located at a side of one of said arcuate abutting surfaces close to the seat body.

11. The joint of claim 6, wherein the movable member further includes two inclined guiding surfaces surrounding the end opening, each of the two inclined guiding surfaces is located between the two engaging recesses; the movable member is a metallic piece integrally formed of one piece; each of the two cushioning portions is an elastic arm and includes a first bending section and a second bending section connected between the first bending section and the connecting portion, and a concave direction of the first bending section is opposite to a concave direction of the second bending section; in the axial direction, a concave depth of each said first bending section is larger than a concave depth of one said second bending section; the movable member further includes two notches facing the two first bending sections, when the movable member is axially shifted relative to the seat body, the two first bending sections are urged to deform, and one of the two first bending sections is partially located within one of the two notches; each of the two clamping portions further includes a second inclined segment connected between one said first inclined segment and the connecting portion, each said second inclined segment and one said first inclined segment are transitionally connected and define a contact portion configured to contact with the central terminal; two opposite sides of each said second inclined segment include at least two projections extending in a direction remote from the connecting portion, the movable member includes a plurality of recessions corresponding to the at least two projections, each of said projections is engaged within one of the plurality of recessions; the outer peripheral surface of the seat body has a first engaging portion, an inner peripheral surface of the sleeve member has a second engaging portion, and the first engaging portion and the second engaging portion are interferingly engageable with each other in the axial direction; the outer peripheral surface of the seat body further includes at least one guiding groove extending in a direction parallel to the axial direction, the first engaging portion is located within the at least one guiding groove, and the second engaging portion is slidable along the at least one guiding groove; the abutting structure includes a plurality of supporting pieces and a plurality of cutting slots arranged alternatively around the axial direction, each of the plurality of supporting pieces is bended in the axial direction and includes an arcuate abutting surface arched outward, and each said arcuate abutting surfaces is configured to be radially abutted against an annular wall of the connector surrounding the central terminal; the plurality of cutting slots are open toward an opening of the sleeve member; the plurality of supporting pieces protrude beyond an end surface of the seat body in the axial direction, and each of the plurality of supporting pieces has at least one through hole located at a side of one of said arcuate abutting surfaces close to the seat body; and the movable member is entirely located in the moving space.

12. A connector, including the joint of claim 1, further including:

a plug, having the central terminal disposed thereon and including an annular wall surrounding and spaced apart from the central terminal; wherein when the central terminal is connected with the joint, the abutting structure is received inside the annular wall and abutted against the annular wall.

* * * * *